(12) United States Patent
Johnson et al.

(10) Patent No.: US 9,020,683 B1
(45) Date of Patent: Apr. 28, 2015

(54) METHOD AND SYSTEM TO DETECT FAULTS OF A TRAILER ELECTRICAL SYSTEM

(75) Inventors: Brian E. Johnson, Novi, MI (US); Jamie A. Mleczko, Washington, MI (US); Kang Li, Windsor (CA)

(73) Assignee: Yazaki North America, Inc., Canton, MI (US)

( * ) Notice: Subject to any disclaimer, the term of this patent is extended or adjusted under 35 U.S.C. 154(b) by 2425 days.

(21) Appl. No.: 11/774,153

(22) Filed: Jul. 6, 2007

(51) Int. Cl.
*G01M 17/00* (2006.01)
*G06F 7/00* (2006.01)
*G06F 11/30* (2006.01)
*G06F 19/00* (2011.01)
*G07C 5/00* (2006.01)
*B62D 59/00* (2006.01)
*H02H 9/00* (2006.01)

(52) U.S. Cl.
CPC . *B62D 59/00* (2013.01); *H02H 9/00* (2013.01)

(58) Field of Classification Search
USPC .................................. 180/14.1, 14.7
See application file for complete search history.

(56) References Cited

U.S. PATENT DOCUMENTS

| | | | |
|---|---|---|---|
| 2,743,431 A | 4/1956 | Wright | |
| 3,840,852 A | 10/1974 | Schwellenbach | |
| 3,987,424 A | 10/1976 | Brouwer et al. | |
| 4,068,216 A | 1/1978 | Brouwer et al. | |
| 4,291,302 A | 9/1981 | King et al. | |
| 5,144,282 A | 9/1992 | Sutterlin et al. | |
| 5,254,971 A | 10/1993 | Sutterlin et al. | |
| 5,515,028 A | 5/1996 | Dittmar | |
| 5,604,439 A | 2/1997 | Walkington et al. | |
| 5,886,543 A | 3/1999 | Moody | |
| 6,157,296 A | 12/2000 | Endoh | |
| 6,466,028 B1 * | 10/2002 | Coppinger et al. | 324/504 |
| 6,525,654 B1 | 2/2003 | Siggers | |
| 6,535,113 B1 | 3/2003 | Gravolin | |
| 6,713,966 B2 | 3/2004 | Shultz et al. | |
| 6,720,883 B2 | 4/2004 | Kuhr et al. | |
| 6,788,195 B1 | 9/2004 | Stegman et al. | |
| 7,023,353 B2 | 4/2006 | Tewell et al. | |
| 7,046,132 B2 | 5/2006 | Carpenter | |
| 7,124,003 B1 * | 10/2006 | West et al. | 701/29 |
| 7,403,100 B2 * | 7/2008 | Peterson | 340/431 |
| 7,777,495 B2 * | 8/2010 | Mannerfelt | 324/414 |
| 7,904,260 B2 * | 3/2011 | Burlak et al. | 702/57 |
| 2008/0204033 A1 * | 8/2008 | Burlak et al. | 324/504 |

* cited by examiner

*Primary Examiner* — Nicholas Kiswanto
(74) *Attorney, Agent, or Firm* — Harness, Dickey & Pierce, P.L.C.

(57) ABSTRACT

A diagnostic system for diagnosing faults in a trailer electrical system generally includes a mode determination module that determines a current operating mode to be one of a sleep mode, a normal mode, a situational awareness mode, and an adaptive calibration mode. A first mode module operates when the current operating mode is the normal mode and during operation, diagnoses an open circuit fault of the trailer electrical system based on a comparison of a current load on the trailer electrical system and an average load.

25 Claims, 8 Drawing Sheets

US 9,020,683 B1

METHOD AND SYSTEM TO DETECT FAULTS OF A TRAILER ELECTRICAL SYSTEM

FIELD

The present teachings relate to methods and systems for detecting faults of a trailer electrical system and more particularly to methods and systems for detecting an open lamp filament of a trailer electrical system.

BACKGROUND

It is common for an owner of a vehicle, such as an automobile, truck or the like, to tow or trail various trailers, such as a camper trailer, a boat trailer, a storage trailer, or the like. Electrical power is made available to the trailer by an electrical connector that electrically connects the towing vehicle's electrical supply system to a trailer electrical system.

The trailer electrical system can include, for example, a right turn/stop lamp and a left/turn stop lamp. When either of the lamps fail due to, for example, an open filament, the vehicle operator is most often unaware of the failure. It is not until other bystanders notify the operator or the operator performs an inspection while the trailer is in a parked condition that the operator becomes aware of the failure.

SUMMARY

The present teachings generally include a diagnostic system for diagnosing faults in a trailer electrical system. The diagnostic system generally includes a mode determination module that determines a current operating mode to be one of a sleep mode, a normal mode, a situational awareness mode, and an adaptive calibration mode. A first mode module operates when the current operating mode is the normal mode and during operation, diagnoses an open circuit fault of the trailer electrical system based on a comparison of a current load on the trailer electrical system and an average load.

Further areas of applicability will become apparent from the description provided herein. It should be understood that the description and specific examples are intended for purposes of illustration only and are not intended to limit the scope of the present teachings.

BRIEF DESCRIPTION OF THE DRAWINGS

The drawings described herein are for illustration purposes only and are not intended to limit the scope of the present teachings in any way.

DETAILED DESCRIPTION

Figure 1:
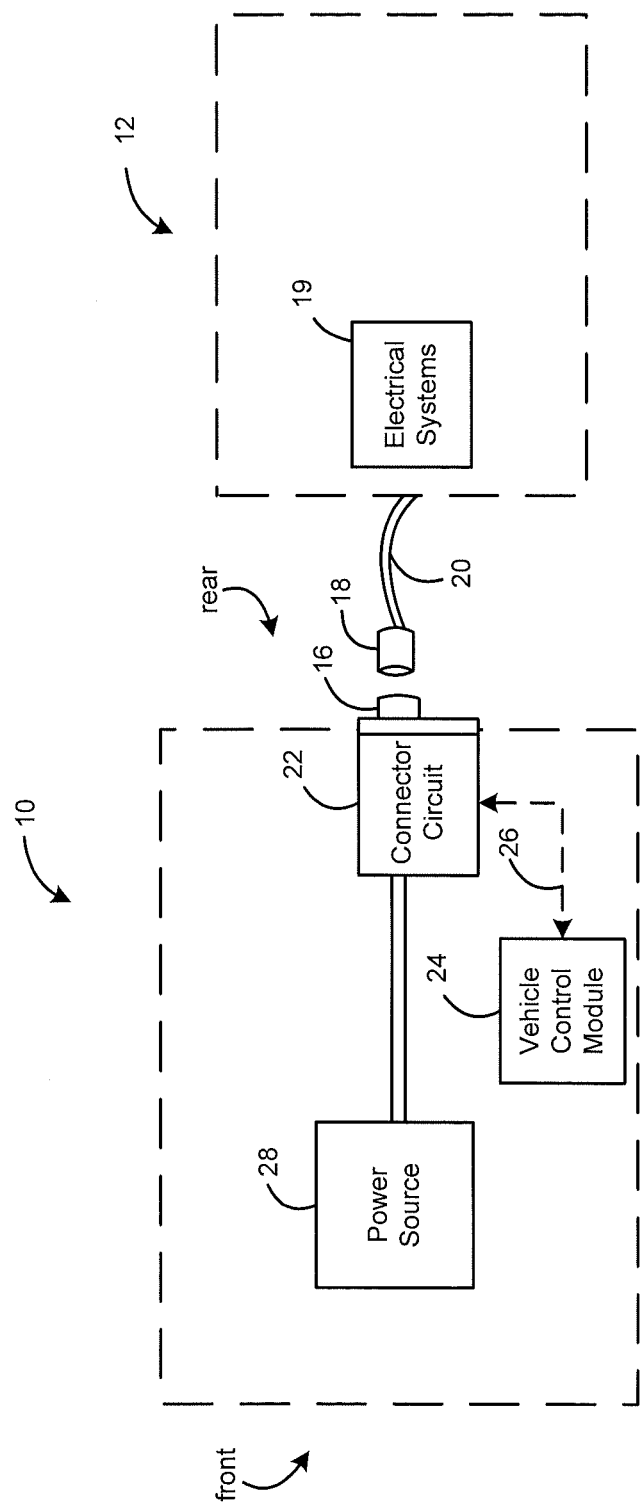
FIG. 1 is a block diagram illustrating a vehicle including a trailer diagnostic system in accordance with various aspects of the present teachings.

The following description is merely exemplary in nature and is not intended to limit the present teachings, their application, or uses. It should be understood that throughout the drawings, corresponding reference numerals indicate like or corresponding parts and features. As used herein, the term module, control module, component and/or device can refer to one or more of the following: an application specific integrated circuit (ASIC), an electronic circuit, a processor (shared, dedicated or group) and memory that executes one or more software or firmware programs, a combinational logic circuit and/or other suitable mechanical, electrical or electro-mechanical components that can provide the described functionality and/or combinations thereof.

With reference to FIG. 1 and in one aspect of the present teachings, a vehicle shown generally at 10 can include a trailer diagnostic system. It can be appreciated in light of the disclosure that the trailer diagnostic system can be applicable to various trailer systems. For example, a similar trailer diagnostic system can be used for tractors and trailers. For exemplary purposes, various aspects of the trailer diagnostic system will be discussed in the context of the vehicle 10 and a trailer 12.

As shown in FIG. 1, the vehicle 10 can include at least one vehicle electrical connector 16 that can couple to or be near a rear end of the vehicle 10. The vehicle electrical connector 16 can include a plurality of output pins that can mate with a plurality of receptacles, or electrical terminals of a trailer electrical connector 18. In various aspects, the trailer electrical connector 18 can be connected and disconnected to the vehicle electrical connector 16. When connected, the vehicle electrical connector 16 can provide current from a power source 28 to the trailer electrical connector 18. The trailer electrical connector 18 can provide current to various components of the electrical system 19 of the trailer 12 via a wiring harness 20. Such electrical system 19 can include, but is not limited to, a right turn/stop lamp (RTL), a left turn/stop lamp (LTL), and a braking system.

As will be discussed further, the trailer diagnostic system can include a connector circuit 22 that can diagnose open filaments as well as other electrical faults of the electrical system 19. The connector circuit 22 can communicate the faults to a vehicle control module 24 and can receive vehicle commands from the vehicle control module 24 via a communication bus 26. The vehicle control module 24 can generate a fault signal to alert a vehicle operator of the fault based on the communicated fault.

Figure 2:
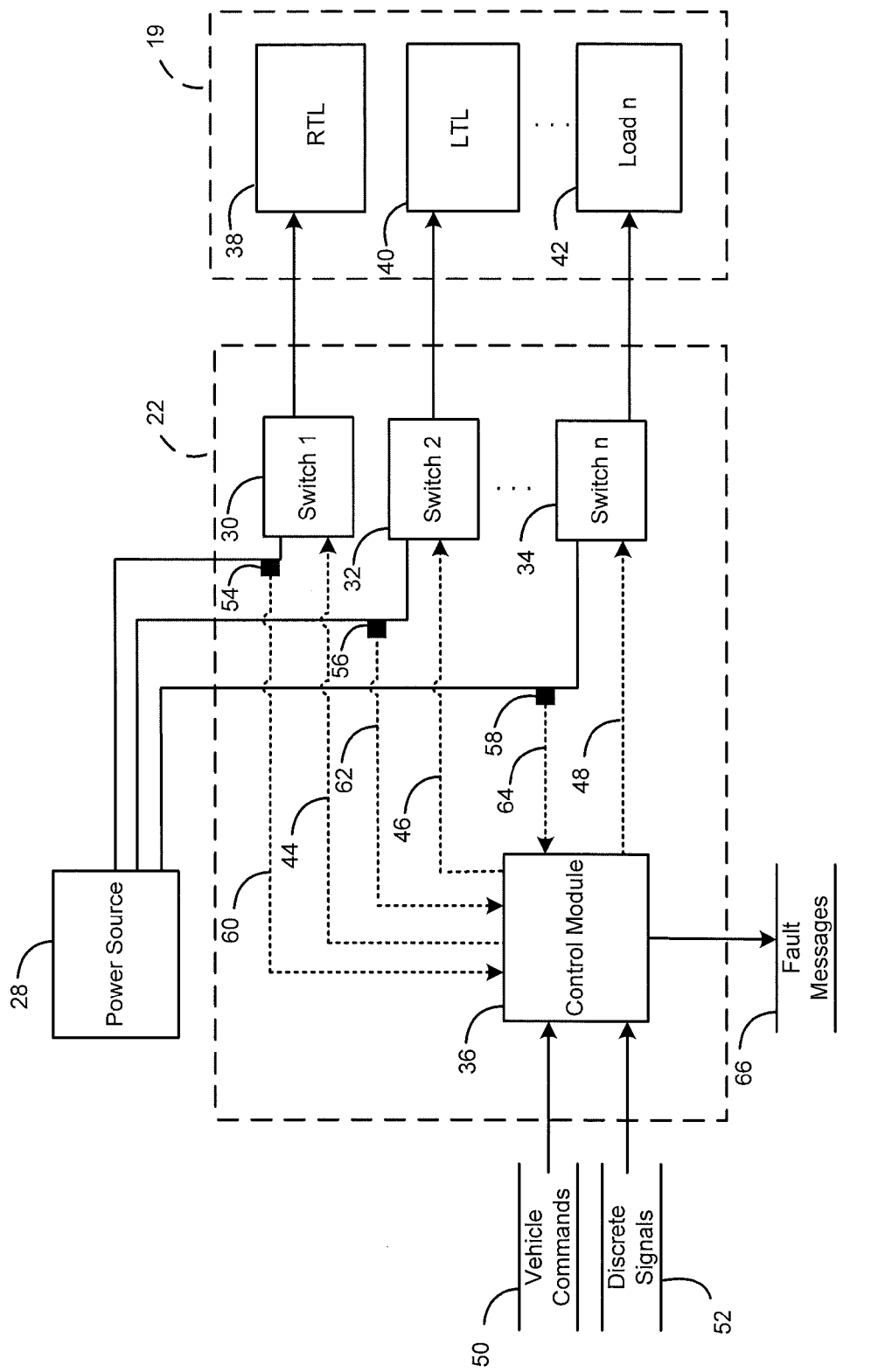
FIG. 2 is a block diagram illustrating an exemplary trailer diagnostic system implemented in a vehicle in accordance with various aspects of the present teachings.

With reference to FIG. 2, a block diagram illustrates an exemplary diagnostic system implemented in the vehicle 10 in accordance with various aspects of the present teachings. As shown, one or more switches 30, 32, and 34, such as a metal-oxide-semiconductor field-effect transistor (MOSFET, simplified as FET hereafter), can be controlled by a control module 36 to allow current to flow from the power source 28 to the electrical system 19. The electrical system 19 can include, but is not limited to, a RTL 38, a LTL 40, and one or more other electrical loads 42. The control module 36 can control the state of the switches 30, 32, and 34 via control signals 44, 46, and 48 respectively, based on vehicle commands 50 received from the vehicle control module 24 (FIG. 1) and/or discrete input signals 52 received from hardwire inputs (not shown). The control module 36 can diagnose faults of each of the electrical systems 38, 40, and 42 based on a flow of current through each of the corresponding circuits. Current sensors 54, 56, and 58 can generate current signals 60, 62, and 64 respectively, for each circuit. As will be discussed further, the control module 36 can diagnose at least one of an open circuit fault, a circuit error, and an over-load fault based on the current signals 60, 62, and 64 and can generate a fault message 66 accordingly.

Figure 3:
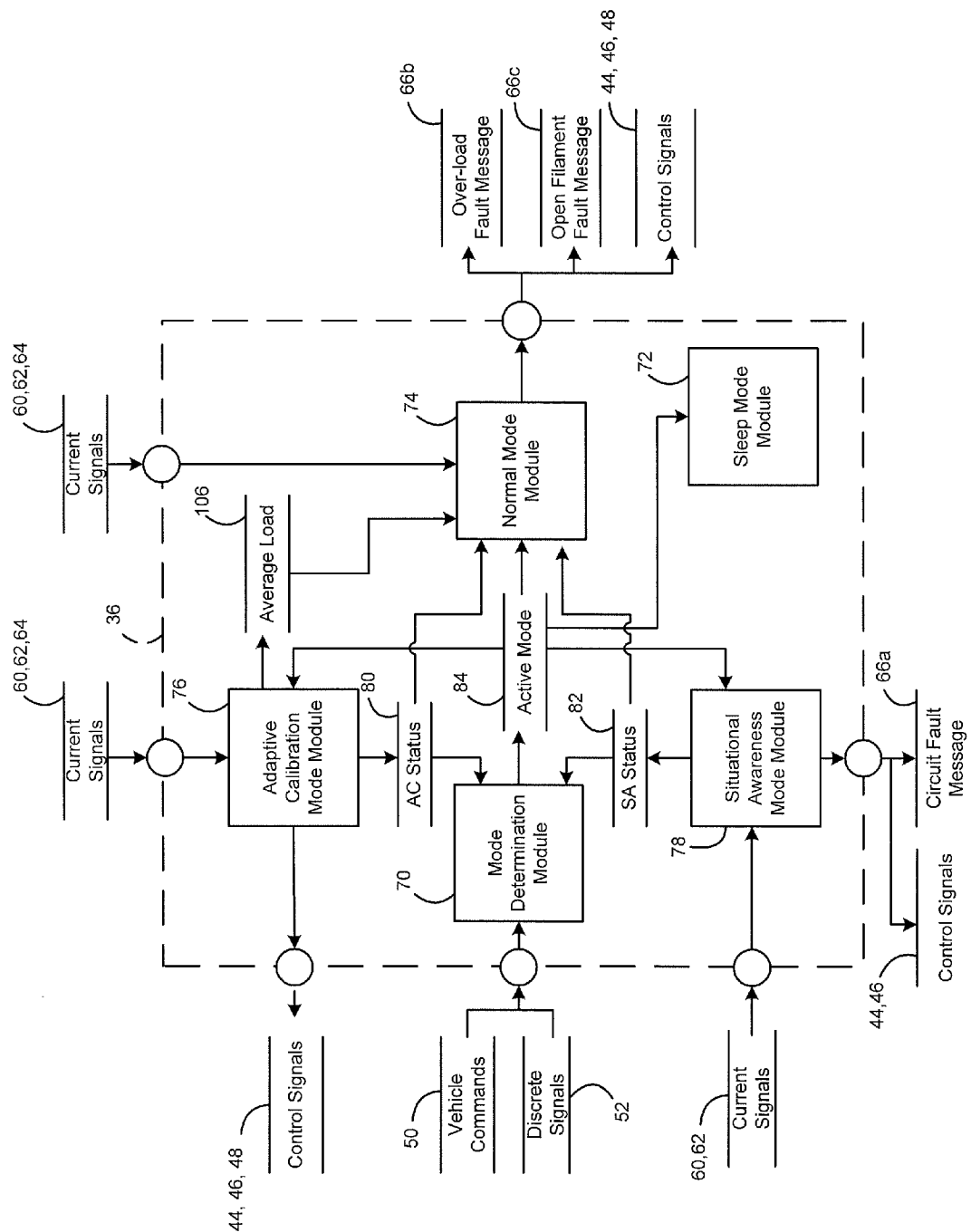
FIG. 3 is a data flow diagram illustrating an exemplary trailer diagnostic system in accordance with various aspects of the present teachings.

With reference to FIG. 3, a data flow diagram illustrates an exemplary trailer diagnostic system that can be implemented within the control module 36 in accordance with various aspects of the present teachings. It will be appreciated in light of the disclosure that various aspects of trailer diagnostic systems in accordance with the present teachings can include any number of sub-modules embedded within the control module 36. The sub-modules can be combined and/or further partitioned to similarly diagnose the electrical system 19. Inputs to the system can be sensed from the vehicle 10, received from other control modules, such as the vehicle control module 24 (FIG. 1), and/or determined by other sub-modules (not shown) within the control module 36. In various aspects of the present teachings, the control module 36 of FIG. 3 can include a mode determination module 70, a sleep mode module 72, a normal mode module 74, an adaptive calibration (AC) mode module 76, and a situational awareness (SA) mode module 78.

The mode determination module 70 can receive as input the vehicle command 50, the discrete input signals 52, an adaptive calibration (AC) status 80, and/or a situational awareness (SA) status 82. The mode determination module 70 can determine an active mode 84 to be at least one of a normal mode, a sleep mode, a situational awareness (SA) mode, and an adaptive calibration (AC) mode based on the inputs 50, 52, 80 and/or 82 and predefined transition conditions.

Figure 4:
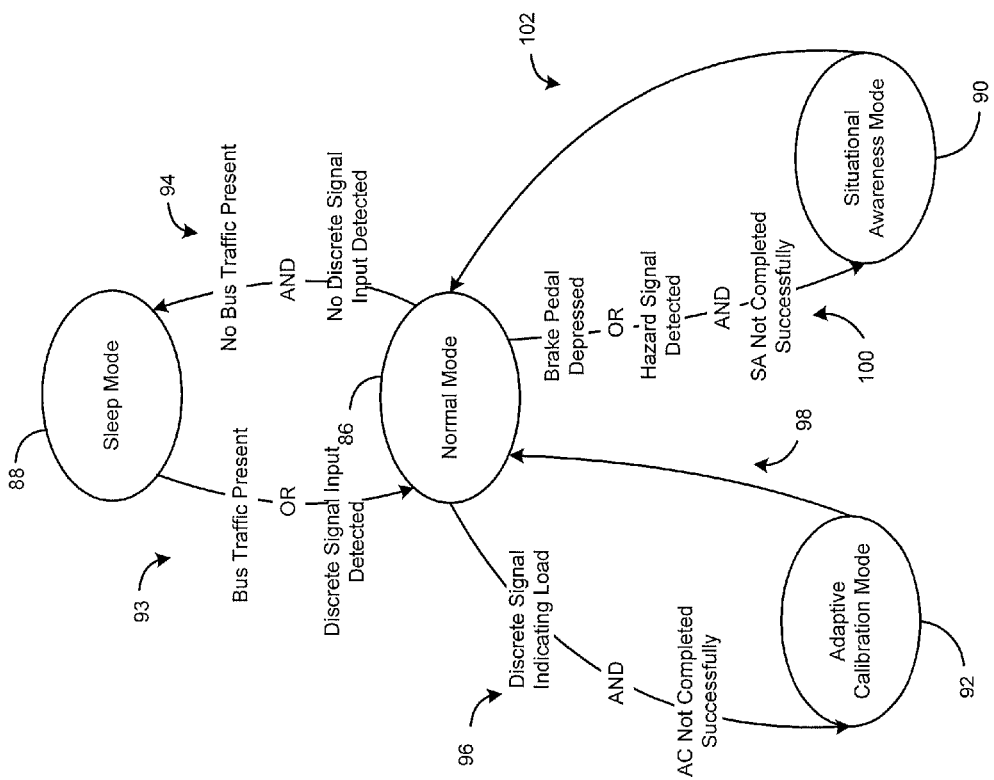
FIG. 4 is a state transition diagram illustrating exemplary modes and transitions of the mode determination module of the trailer diagnostic system in accordance with various aspects of the present teachings.

As shown by the exemplary state transition diagram of FIG. 4 and with continued reference to FIG. 3, the mode determination module 70 can transition the active mode 84 between a sleep mode 88 and a normal mode 86 and between a normal mode 86 and a SA mode 90 and an AC mode 92 based on predefined transition conditions 93, 94, 96, 98, 100, and 102.

For example, the mode determination module 70 can transition the active mode 84 from the sleep mode 88 to the normal mode 86 when the vehicle commands 50 or the discrete input signals 52 are present as shown at 93. The mode determination module 70 can transition the active mode 84 from the normal mode 86 to the SA mode 90 when the vehicle commands 50 or the discrete input signals 52 indicate that the brake pedal has been depressed or the hazard signals are requested and the SA status 82 indicates that the SA mode 90 has not completed successfully as shown at 100. The mode determination module 70 can transition the active mode 84 from the SA mode 90 back to the normal mode 86 when the SA mode completes as shown at 102.

In another example, the mode determination module 70 can transition the active mode 84 from the normal mode 86 to the AC mode 92 when the vehicle commands 50 or the discrete input signals 52 request a circuit to be activated and the AC status 80 indicates that the AC mode has not completed successfully as shown at 96. The mode determination module 70 can transition the active mode 84 from the AC mode 92 back to the normal mode 86 when the AC mode completes as shown at 98. Finally, the mode determination module 70 can transition the active mode 84 from the normal mode 86 back to the sleep mode 88 when there are no vehicle commands 50 received and no discrete input signals 52 detected as shown at 94. In various aspects, the transition condition 94 can be based on inactivity for a predetermined time period.

With reference back to FIG. 3, the sleep mode module 72 can receive as input the active mode 84. When the active mode 84 indicates that the current mode is the sleep mode 88 (FIG. 4), the sleep mode module 72 can deactivate the switches 30, 32, and 34 and other circuitry to minimize the consumption of power from the power source 28. The sleep mode module 72 can clear all stored values relating to the diagnosing of the electrical system 19 (FIG. 1), as will be discussed further.

The SA mode module 78 can receive as input the active mode 84 and the current signals 60 and 62. When the active mode 84 indicates that the current mode is the SA mode 90 (FIG. 4), the SA mode module 78 can activate the switches 30 and 32 via control signals 44 and 46 to permit the flow of current from the power source 28 (FIG. 2) to the RTL 38 and the LTL 40, respectively. The SA mode module 78 can then monitor the current signals 60 and 62 to determine whether the circuit for the respective electrical system 19 (FIG. 2) is open or closed. Based on whether the circuits are open or closed, the SA mode module 78 can set the SA status 82 to indicate whether the monitoring has completed successfully or completed unsuccessfully and can selectively generate a fault message 66a.

The AC mode module 76 can receive as input the active mode 84 and the current signals 60, 62, or 64. When the active mode 84 indicates that the current mode is the AC mode 92 (FIG. 4), the AC mode module 76 can generate the appropriate control signal 44, 46, or 48 to activate the switches 30, 32, or 34 (FIG. 2); can measure a load for the active circuit based on the current signals 60, 62, or 64; and can determine an average load 106 over a predetermined time period. The AC mode module 76 then can store the average load 106 for future comparisons. Once the average load 106 is computed, the AC mode module 76 can set the AC status 80 to indicate whether the adaptive calibration has completed successfully or unsuccessfully.

The normal mode module 74 can receive as input the active mode 84, the SA status 82, the AC status 80, the current signal 60, 62, or 64, and the average load 106. When the active mode 84 indicates that the current mode is the normal mode 86 and once the SA status 82 and the AC status 80 indicate the SA and AC have been completed successfully, the normal mode module 74 can generate the appropriate control signal 44, 46, or 48 and compare a current load to the average load 106 to determine whether an open filament/circuit fault or an over-load fault has occurred. The normal mode module 74 can generate an over-load fault message 66b and/or can open filament/circuit fault message 66c.

Figure 5:
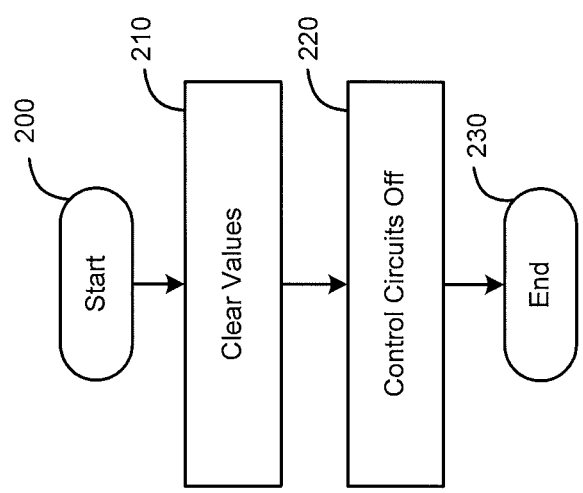
FIG. 5 is a process flow diagram illustrating an exemplary method that can be performed while in the sleep mode of the trailer diagnostic system in accordance with various aspects of the present teachings.

With reference to FIG. 5, a process flow diagram illustrates a sleep mode method that can be performed by the sleep mode module 72 implemented in accordance with FIG. 3. The method can be scheduled to run when the active mode 84 (FIG. 3) becomes the sleep mode 88 (FIG. 4). As can be appreciated in light of the disclosure, the order of operation within the method is not limited to the sequential execution as illustrated in FIG. 5, but may be performed in one or more varying orders as applicable and in accordance with the present teachings.

In one example, the method may begin at 200. The stored values, such as the average load 106, the AC status 80, and the SA status 82 can be cleared at 210. The switches 30, 32, and 34 can be deactivated and other circuitry can be controlled OFF at 220. The method may end at 230.

Figure 6:
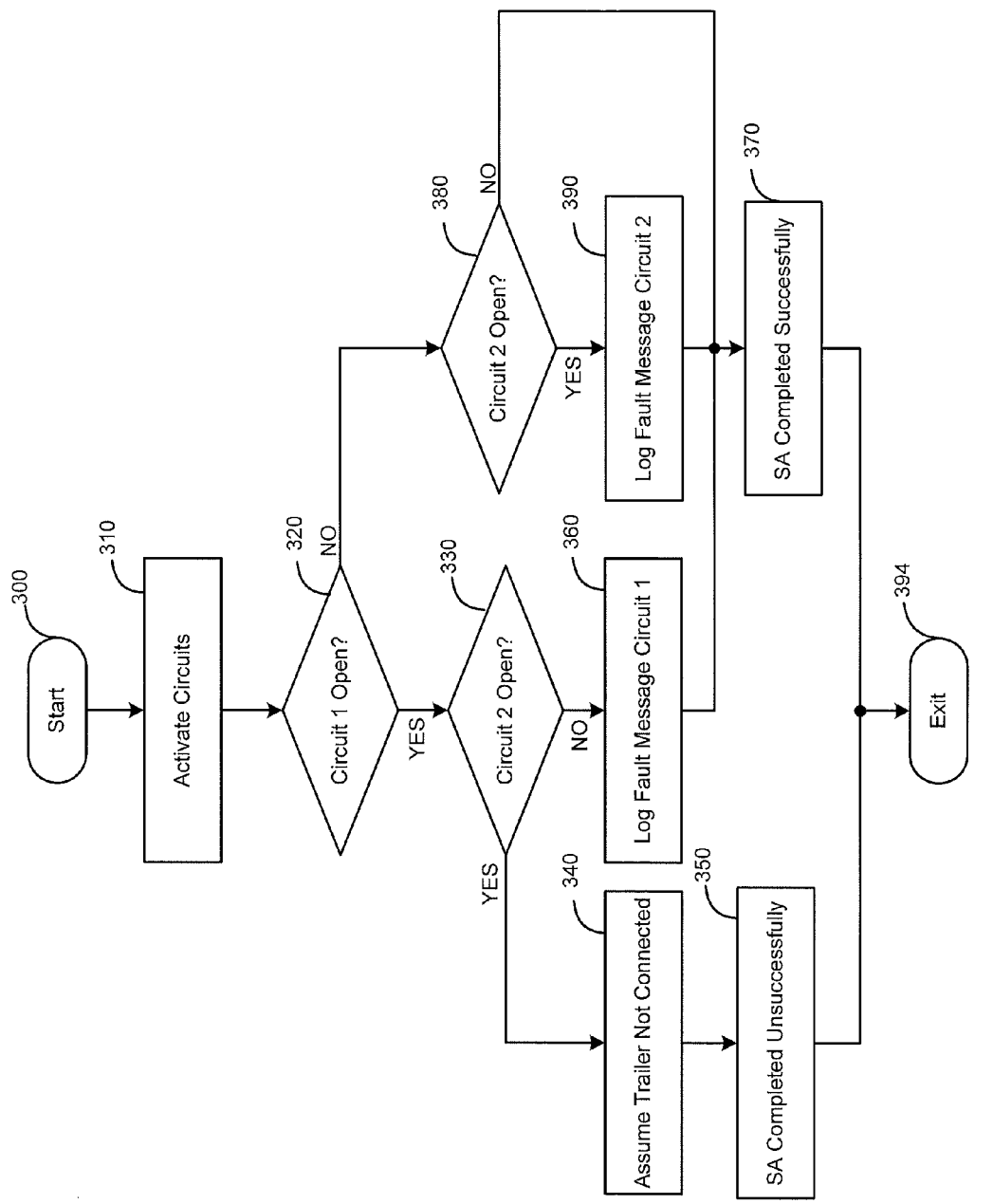
FIG. 6 is a process flow diagram illustrating an exemplary method that can be performed while in a situational awareness mode of the trailer diagnostic system in accordance with various aspects of the present teachings.

With reference to FIG. 6, a process flow diagram illustrates a situational awareness mode method that can be performed by the SA mode module 78, implemented in accordance with FIG. 3. The method can be scheduled to run when the active mode 84 (FIG. 3) becomes the SA mode 90 (FIG. 4). As can be appreciated in light of the disclosure, the order of operation within the method is not limited to the sequential execution as illustrated in FIG. 6, but may be performed in one or more varying orders as applicable and in accordance with the present teachings.

In one example, the method may begin at 300. A first circuit (circuit 1), for example, relating to the RTL 38 (FIG. 2) and a second circuit (circuit 2), for example, relating to the LTL 40 (FIG. 2) can be activated at 310. The first circuit can be evaluated at 320. If the first circuit is open at 320, the second circuit can be evaluated at 330. If the second circuit is open at 330, then both circuits are open and it can be assumed that the trailer 12 (FIG. 1) is not electrically connected to the vehicle 10 (FIG. 1) at 340. The SA status 82 (FIG. 3) can be set to indicate the mode has completed unsuccessfully at 350. Otherwise, if the second circuit is not open (e.g., closed) at 330, then the first circuit is open and the second circuit is closed, and a fault message 66a (FIG. 3) can be logged for circuit 1 at 360 and the SA status 82 (FIG. 3) can be set to indicate the mode has completed successfully at 370.

However, if the first circuit is not open (e.g., closed) at 320, the second circuit can be evaluated at 380. If the second circuit is open at 380, then the first circuit is closed and the second circuit is open, a fault message 66a (FIG. 3) can be logged for circuit 2 at 390 and the SA status 82 (FIG. 3) can be set to indicate the mode has completed successfully at 370. Otherwise, if the second circuit is not open (e.g., closed) at 380, then both circuits are closed. The SA status 82 (FIG. 3) can be set to indicate the mode has completed successfully at 370. The method may end at 394.

Figure 7:
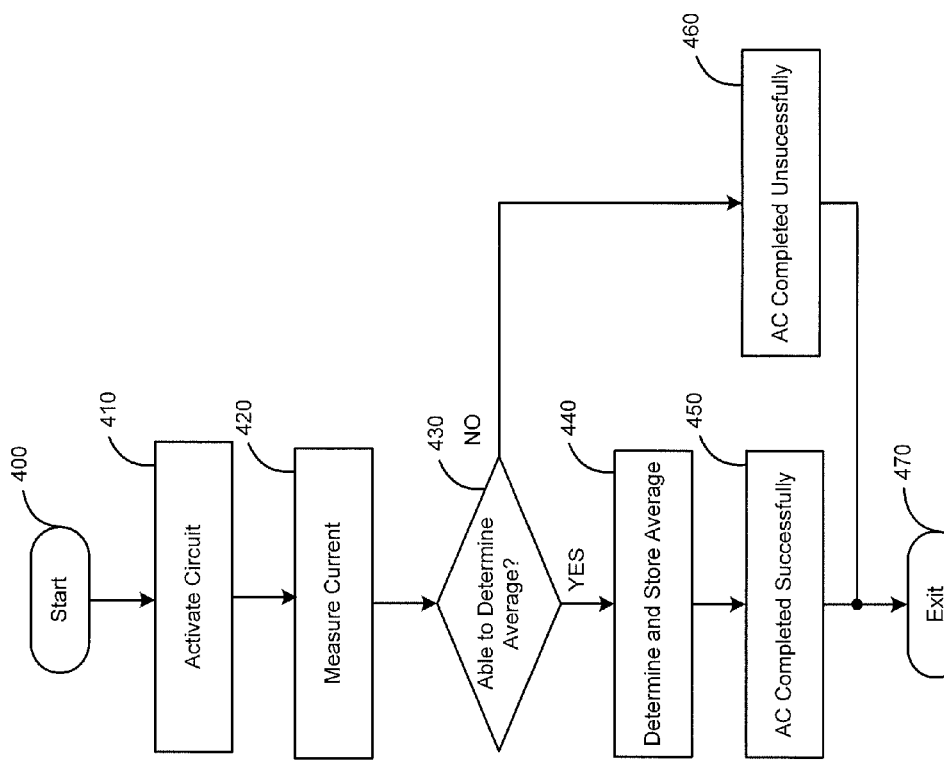
FIG. 7 is a process flow diagram illustrating an exemplary method that can be performed while in an adaptive calibration mode of the trailer diagnostic system in accordance with various aspects of the present teachings.

With reference to FIG. 7, a process flow diagram illustrates an adaptive calibration mode method that can be performed by the AC mode module 76, implemented in accordance with FIG. 3. The method can be scheduled to run when the active mode 84 (FIG. 3) becomes the AC mode 92 (FIG. 4). As can be appreciated in light of the disclosure, the order of operation within the method is not limited to the sequential execution as illustrated in FIG. 7, but may be performed in one or more varying orders as applicable and in accordance with the present teachings.

In one example, the method may begin at 400. The circuit can be activated at 410. The current for the active circuit can be measured at 420. If the average load is determinable at 430, the average load 106 (FIG. 3) over a predetermined time period can be estimated and stored at 440. The AC status 80 (FIG. 3) can be set to indicate that the AC mode has completed successfully at 450. The method may end at 470. However, if the average load 106 (FIG. 3) is not able to be determined at 430, the AC status 80 (FIG. 3) can be set to indicate that the AC mode has completed unsuccessfully at 460 and the method may end at 470.

Figure 8:
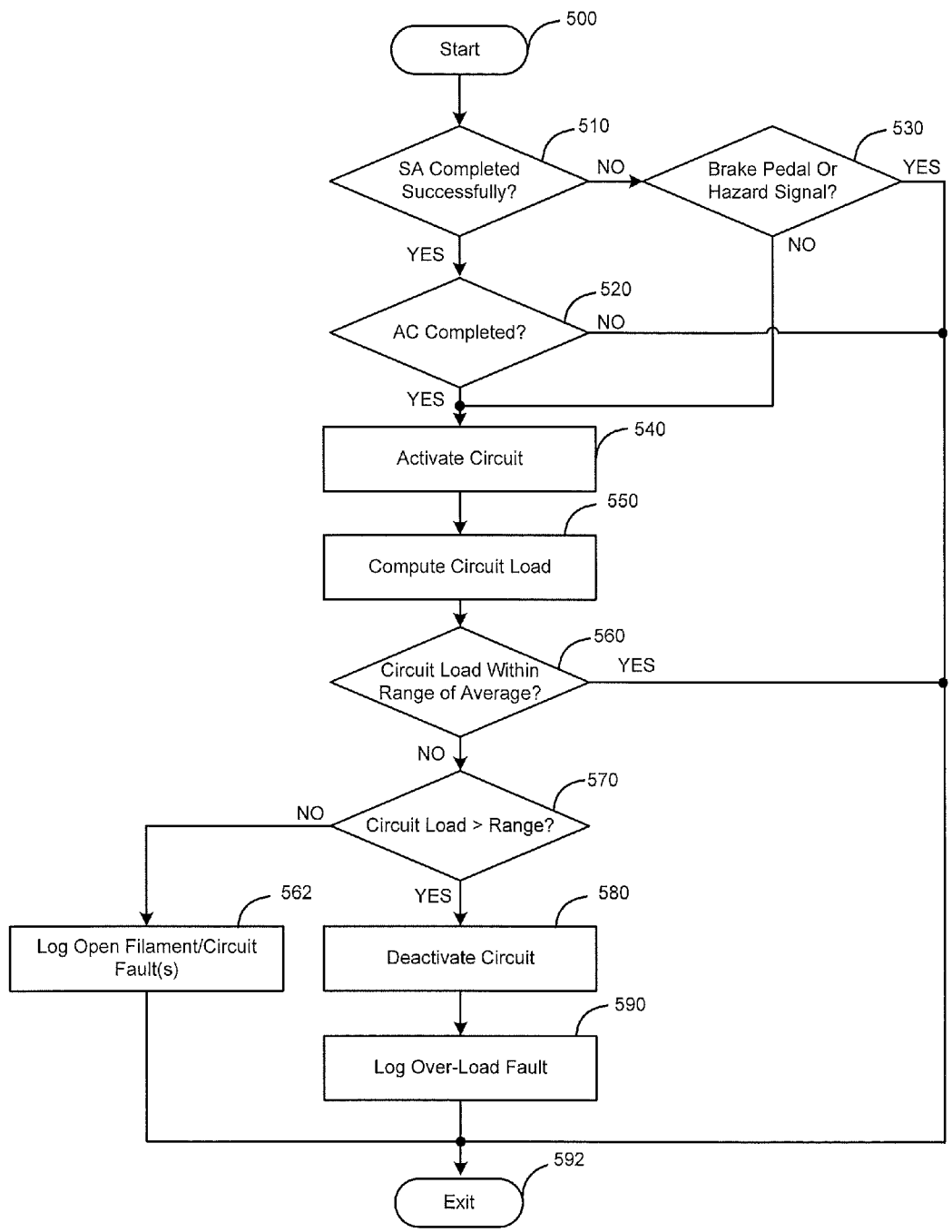
FIG. 8 is a process flow diagram illustrating an exemplary method that can be performed while in a normal mode of the trailer diagnostic system in accordance with various aspects of the present teachings.

With reference to FIG. 8, a process flow diagram illustrates a normal mode method that can be performed by the normal mode module 74, implemented in accordance with FIG. 3. The method can be scheduled to run when the active mode 84 (FIG. 3) becomes the normal mode 86 (FIG. 4). As can be appreciated in light of the disclosure, the order of operation within the method is not limited to the sequential execution as illustrated in FIG. 8, but may be performed in one or more varying orders as applicable and in accordance with the present teachings.

In one example, the method may begin at 500. Upon vehicle command or discrete requests to activate a circuit, the SA status 82 (FIG. 3) and the AC status 80 (FIG. 3) can be evaluated at 510 and 520. If the SA status 82 (FIG. 3) indicates that the SA mode has not completed successfully at 510, the vehicle command or discrete input can be evaluated to see if the brake pedal has been depressed or there is a request for a hazard signal at 530. If the brake pedal has not been depressed and there is no request for a hazard signal at 530, the appropriate switch 30, 32, or 34 (FIG. 2) can be activated at 540 if not already active. Otherwise, if the brake pedal has been depressed or there is a request for a hazard signal at 530, the method may end at 592, for example, to allow the SA mode to complete.

At 520, if the AC status 80 (FIG. 3) indicates that the AC mode has not completed at 510, the method may end at 592, for example, to allow the AC mode to complete. Otherwise, if the AC status 80 (FIG. 3) indicates that the AC mode has completed at 510, the switch 30, 32, or 34 (FIG. 2) can be activated at 540 if not already active. The load for the circuit with the active switch 30, 32, or 34 (FIG. 2) can be estimated at 550 and can be evaluated at 560. If the load is within a predetermined range of the stored average 106 (FIG. 3) at 560, the circuit is operating as intended and the method may end at 592. Otherwise, if the load is outside of the predetermined range of the average 106 (FIG. 3) at 560, the load can be further evaluated at 570.

At 570, if the load is greater than the predetermined range, the switch 30, 32, or 34 (FIG. 2) is deactivated at 580 and the over-load fault message 66b (FIG. 3) can be logged at 590 to indicate that the circuit has been deactivated to protect the circuit from over-load. Otherwise, if the load is less than the predetermined range at 570, the fault message 66c (FIG. 3) can be logged to indicate an open filament for that circuit at 562. The method may end at 592.

While specific aspects have been described in this specification and illustrated in the drawings, it will be understood by those skilled in the art that various changes can be made and equivalents can be substituted for elements thereof without departing from the scope of the present teachings, as defined in the claims. Furthermore, the mixing and matching of features, elements and/or functions between various aspects of the present teachings is expressly contemplated herein so that one skilled in the art will appreciate from the present teachings that features, elements and/or functions of one aspect of the present teachings can be incorporated into another aspect, as appropriate, unless described otherwise above. Moreover, many modifications can be made to adapt a particular situation, configuration or material to the present teachings without departing from the essential scope thereof. Therefore, it is intended that the present teachings not be limited to the particular aspects illustrated by the drawings and described in the specification as the best mode presently contemplated for carrying out the present teachings but that the scope of the present teachings will include many aspects and examples following within the foregoing description and the appended claims.

What is claimed is:

1. A diagnostic system for diagnosing faults in a trailer electrical system, comprising:

a mode determination module that selectively determines a current operating mode to be one of a sleep mode, a normal mode, a situational awareness mode, and an adaptive calibration mode;
a first mode module that operates when said current operating mode is said normal mode and that during operation, diagnoses an open circuit fault of the trailer electrical system based on a comparison of a current load on the trailer electrical system and an average load; and
a fourth mode module that operates when said current operating mode is said sleep mode and that during operation, deactivates power to the trailer electrical system and clears stored values.

2. The diagnostic system of claim 1 further comprising a second mode module that operates when said current operating mode is said adaptive calibration mode and that during operation, estimates said average load.

3. The diagnostic system of claim 1 further comprising a third mode module that operates when said current operating mode is said situational awareness mode and that during operation, diagnoses an electrical connection of the trailer electrical system based on a current flow to the trailer electrical system.

4. The diagnostic system of claim 1 wherein said mode determination module transitions said current operating mode between said sleep mode and said normal mode based on at least one of vehicle commands and discrete input signals.

5. The diagnostic system of claim 1 wherein said mode determination module transitions said current operating mode from said normal mode to said situational awareness mode based on at least one of a brake pedal signal and a hazard signal.

6. The diagnostic system of claim 1 wherein said mode determination module transitions said current operating mode from said normal mode to said situational awareness mode based on a completion status of said situational awareness mode.

7. The diagnostic system of claim 1 wherein said mode determination module transitions said current operating mode from said normal mode to said adaptive calibration mode based on at least one of vehicle commands and discrete input signals.

8. The diagnostic system of claim 1 wherein said mode determination module transitions said current operating mode from said normal mode to said adaptive calibration mode based on a completion status of said adaptive calibration mode.

9. The diagnostic system of claim 1 wherein said mode determination module transitions said current operating mode from at least one of said adaptive calibration mode and said situational awareness mode to said normal mode with a completion status of said mode.

10. A diagnostic system for diagnosing faults in a trailer electrical system of a trailer, comprising:
a first switch that, when activated, allows current to flow to a first trailer load;
a second switch that, when activated, allows current to flow to a second trailer load; and
a control module that selectively controls said activation of said first and said second switches and that diagnoses an open circuit fault of said first and said second switches based on a comparison of said current and an average current, wherein said control module selectively deactivates said first and said second switches and clears stored values after a predetermined period of inactivity.

11. The diagnostic system of claim 10 wherein said control module estimates said average current after a predetermined signal settling period.

12. The diagnostic system of claim 10 wherein said control module diagnoses a circuit fault for at least one of said first switch and said second switch based on said current.

13. The diagnostic system of claim 10 wherein said control module operates in one of four modes:
wherein when in a first mode, said control module diagnoses said open circuit fault of said first and said second switches based on said comparison of said current and said average current,
wherein when in a second mode, said control module estimates said average current after a predetermined signal settling period,
wherein when in a third mode, said control module diagnoses a circuit fault for at least one of said first switch and said second switch based on said current, and
wherein when in a fourth mode, said control module deactivates said first and said second switches and clears stored values after said predetermined period of inactivity.

14. The diagnostic system of claim 13 wherein said control module transitions between said first mode and said fourth mode based on at least one of vehicle commands and discrete input signals.

15. The diagnostic system of claim 13 wherein said control module transitions between said first mode and said second mode based on at least one of a discrete input signal and a completion status of said second mode.

16. The diagnostic system of claim 13 wherein said control module transitions between said first mode and said third mode based on at least one of a brake pedal signal, a hazard signal, and a completion status of said third mode.

17. The diagnostic system of claim 10 wherein said control module transmits a fault message indicating said fault to alert an operator of the trailer.

18. A method of diagnosing faults in a trailer electrical system, comprising:
selectively determining a current operating mode to be at least one of a sleep mode, a normal mode, a situational awareness mode, and an adaptive calibration mode;
when said current operating mode is said normal mode, diagnosing an open filament fault of the trailer electrical system based on a comparison of a current load on the trailer electrical system and an average load; and
when said current operating mode is said sleep mode, deactivating power to the trailer electrical system and clearing stored values.

19. The method of claim 18 further comprising when said current operating mode is said adaptive calibration mode, estimating said average load.

20. The method of claim 18 further comprising when said current operating mode is said situational awareness mode, diagnosing a circuit fault for the trailer electrical system based on a current flow to the trailer electrical system.

21. The method of claim 18 wherein said selectively determining said current operating mode is based on at least one of vehicle commands and discrete input signals.

22. The method of claim 18 wherein said selectively determining said current operating mode is based on at least one of a brake pedal signal and a hazard signal.

23. The method of claim 18 wherein said selectively determining said current operating mode is based on a completion status of said situational awareness mode.

24. The method of claim 18 wherein said selectively determining said current operating mode is based on a completion status of said adaptive calibration mode.

25. The method of claim 18 further comprising generating a fault message indicating said open circuit fault to a vehicle control module.

* * * * *